(12) United States Patent
Chen et al.

(10) Patent No.: US 7,630,745 B2
(45) Date of Patent: Dec. 8, 2009

(54) PDA CARRYING CASE

(75) Inventors: Yun-Lung Chen, Tu-Cheng (TW); Xian-Huang Gao, Shenzhen (CN); Wen-Yu Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 750 days.

(21) Appl. No.: 11/145,436

(22) Filed: Jun. 3, 2005

(65) Prior Publication Data

US 2006/0100005 A1    May 11, 2006

(30) Foreign Application Priority Data

Nov. 5, 2004    (CN) .................. 2004 2 00950114

(51) Int. Cl.
*H04Q 7/32* (2006.01)

(52) U.S. Cl. .............. 455/575.8; 455/575.1; 455/550.1; 455/90.1; 455/90.3; 379/433.01; 379/445; 379/447; 379/451; 379/440; D14/137; D14/138; D14/250; D3/215; D3/218

(58) Field of Classification Search .............. 455/550.1, 455/90.1, 90.2, 90.3, 517, 422.1, 73, 575.1–575.8; 206/320; 379/433.01, 445, 447, 450, 451, 379/440; D14/137, 138, 250; D3/215, 218
See application file for complete search history.

(56) References Cited

U.S. PATENT DOCUMENTS

| 6,758,335 | B2 | 7/2004 | Kajiya | 206/230 |
|---|---|---|---|---|
| 2002/0063162 | A1* | 5/2002 | Endejan et al. | 235/486 |
| 2003/0150756 | A1* | 8/2003 | Kajiya | 206/320 |
| 2004/0173482 | A1* | 9/2004 | Nieves | 206/320 |
| 2004/0202858 | A1* | 10/2004 | Lee | 428/332 |

FOREIGN PATENT DOCUMENTS

CN    01219757.2    2/2002

* cited by examiner

*Primary Examiner*—Keith T Ferguson
(74) *Attorney, Agent, or Firm*—D. Austin Bonderer

(57) ABSTRACT

A personal data assistant (PDA) carrying case includes a main body (10), an expansion cover (40) having a first clasp (46) extending therefrom, a resilient clip (22) mounted on the main body, and a button (29). An opening (33) is defined in the main body for matching the expansion cover. A locking edge (36) is formed for engaging with the first clasp. A through hole (24) is defined in main body corresponding to the first clasp. The resilient clip has a projecting portion (222) corresponding to the through hole. The resilient clip deforms elastically to have the projecting portion pressing the button, so that the button drives the first clasp to disengage the first clasp from the locking edge of the main body.

14 Claims, 4 Drawing Sheets

PDA CARRYING CASE

BACKGROUND OF THE INVENTION

1. Field of the Invention

The present invention relates to carrying cases, and particularly to a carrying case of a personal data assistant (PDA).

2. Background of the Invention

Many users of PDA devices desire carrying cases to carry, cover and protect their PDAs. Conventional PDA carrying case is made from flexible leather. The flexible leather only protects the PDA from being scrapped, but not from being hit.

An improvement in the carrying case of the PDA is illustrated and described in China Patent No. 01219757.2. In this patent, a rigid PDA case is disclosed. The PDA case includes a main body and a cover. A suitable space is formed at the main body for receiving a PDA. An opening is defined in a front portion of the main body. A pair of guiding slots is defined in both sides of inside surface of the main body. The cover is pivotally attached to the main body and covers the opening of the front portion. The PDA slides into the main body along the guiding slots, and is thus mounted in the main body. When using the PDA, the cover is opened.

However, the functions of PDA are increased gradually and this causes a corresponding increase in expansion card interfaces with the PDA. The PDA case disclosed above cannot protect peripheral expansion cards plugged in the PDA.

What is needed, therefore, is a PDA carrying case having an expansion cover and be convenient to secure expansion cards.

SUMMARY

A personal data assistant (PDA) carrying case in accordance with a preferred embodiment of the invention includes a main body, an expansion cover having a first clasp extending therefrom, a resilient clip mounted on the main body and a button. An opening is defined in the main body for matching the expansion cover. A locking edge is formed at the main body for engaging with the first clasp. A through hole is defined in main body corresponding to the first clasp. The resilient clip has a projecting portion corresponding to the through hole. The button is received in the through hole. The resilient clip deforms elastically to have the projecting portion pressing the button, so that the button drives the first clasp to disengage the first clasp from the locking edge of the main body.

Other advantages and novel features of the present invention will be drawn from the following detailed description of a preferred embodiment of the present invention with attached drawings, in which:

DETAILED DESCRIPTION OF PREFERRED EMBODIMENT

Figure 1:
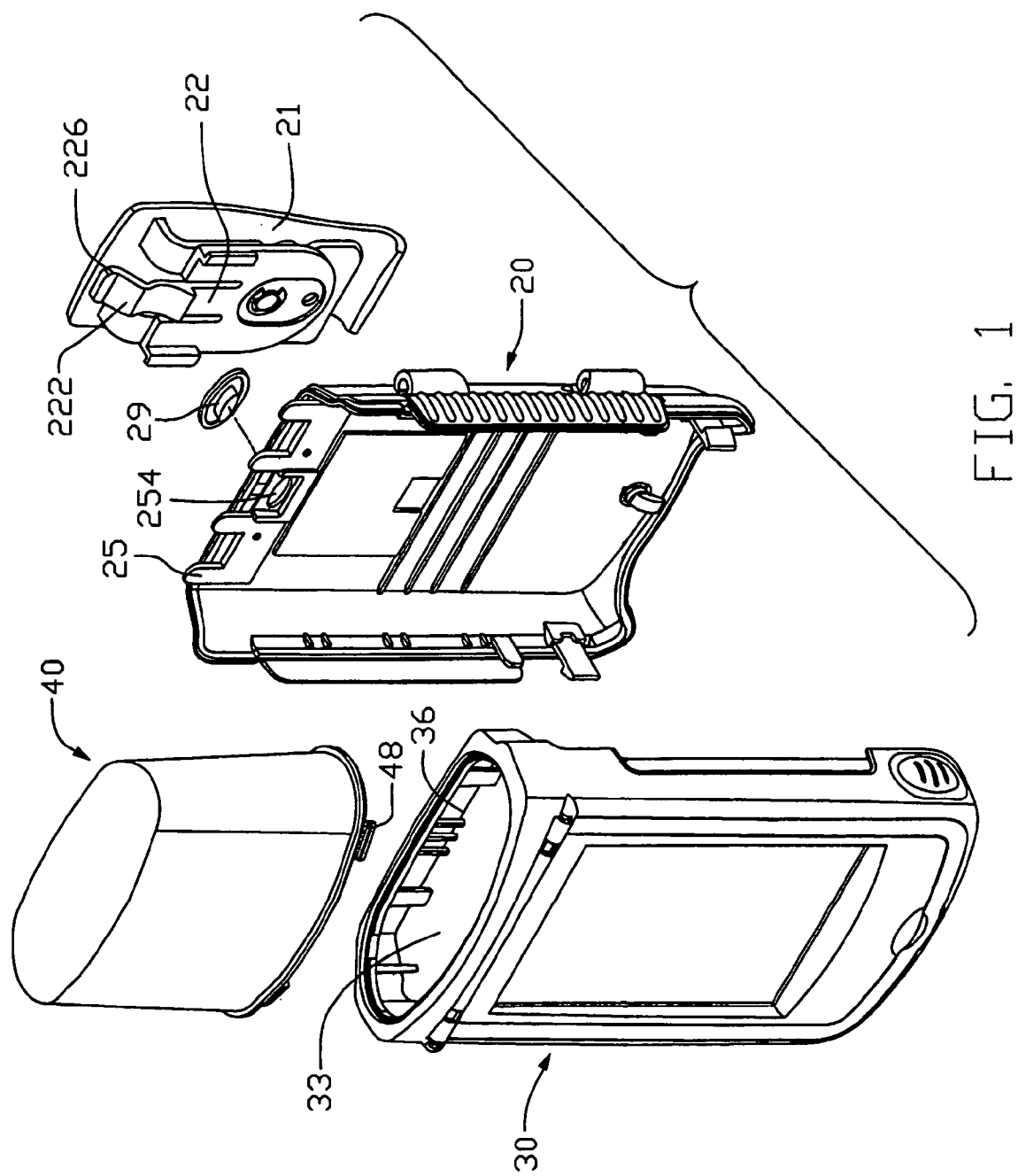
FIG. 1 is an exploded, isometric view of a personal data assistant (PDA) carrying case in accordance with a preferred embodiment of the present invention.
Figure 2:
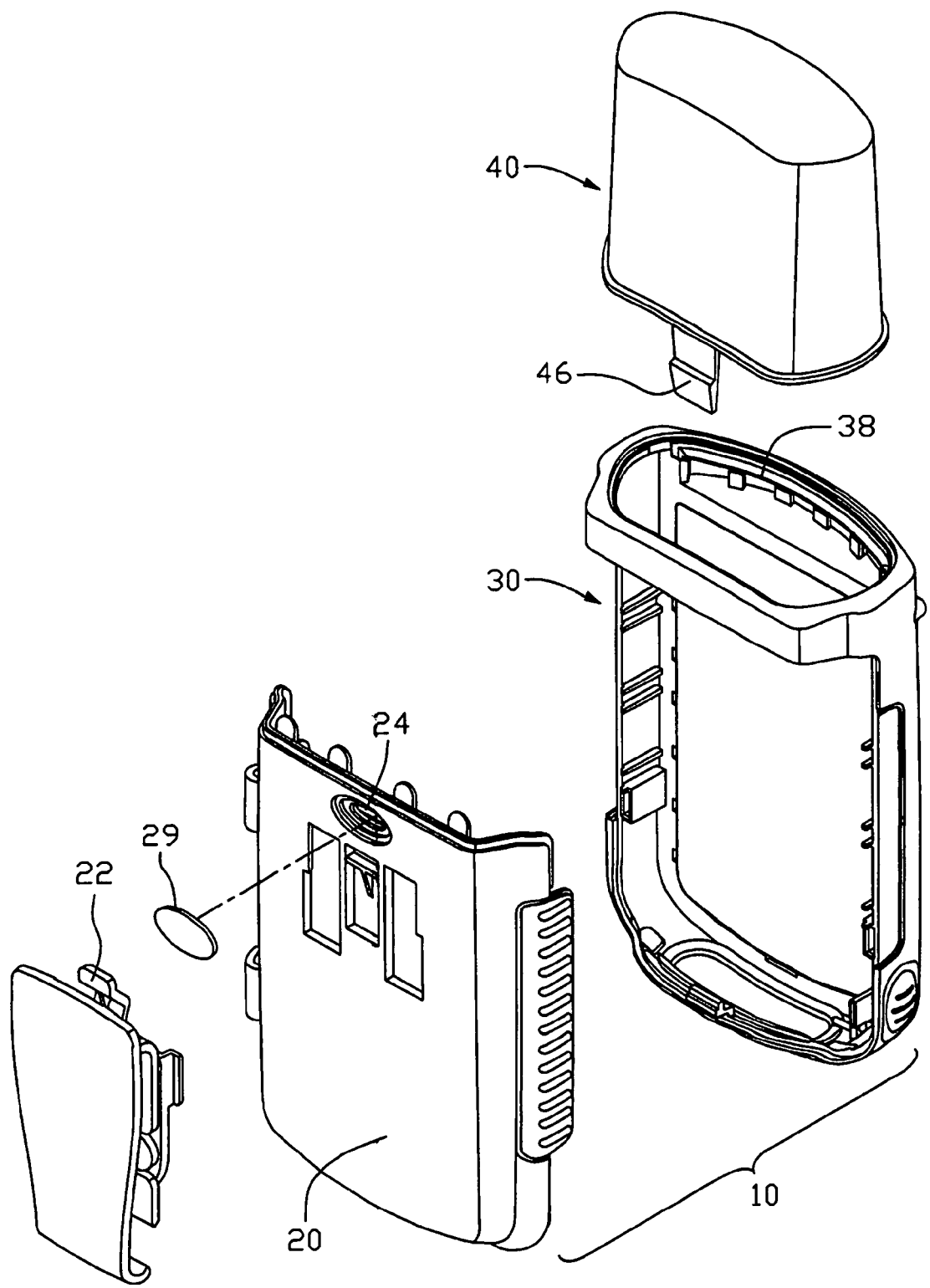
FIG. 2 is another view of the PDA carrying case of FIG. 1.
Figure 3:
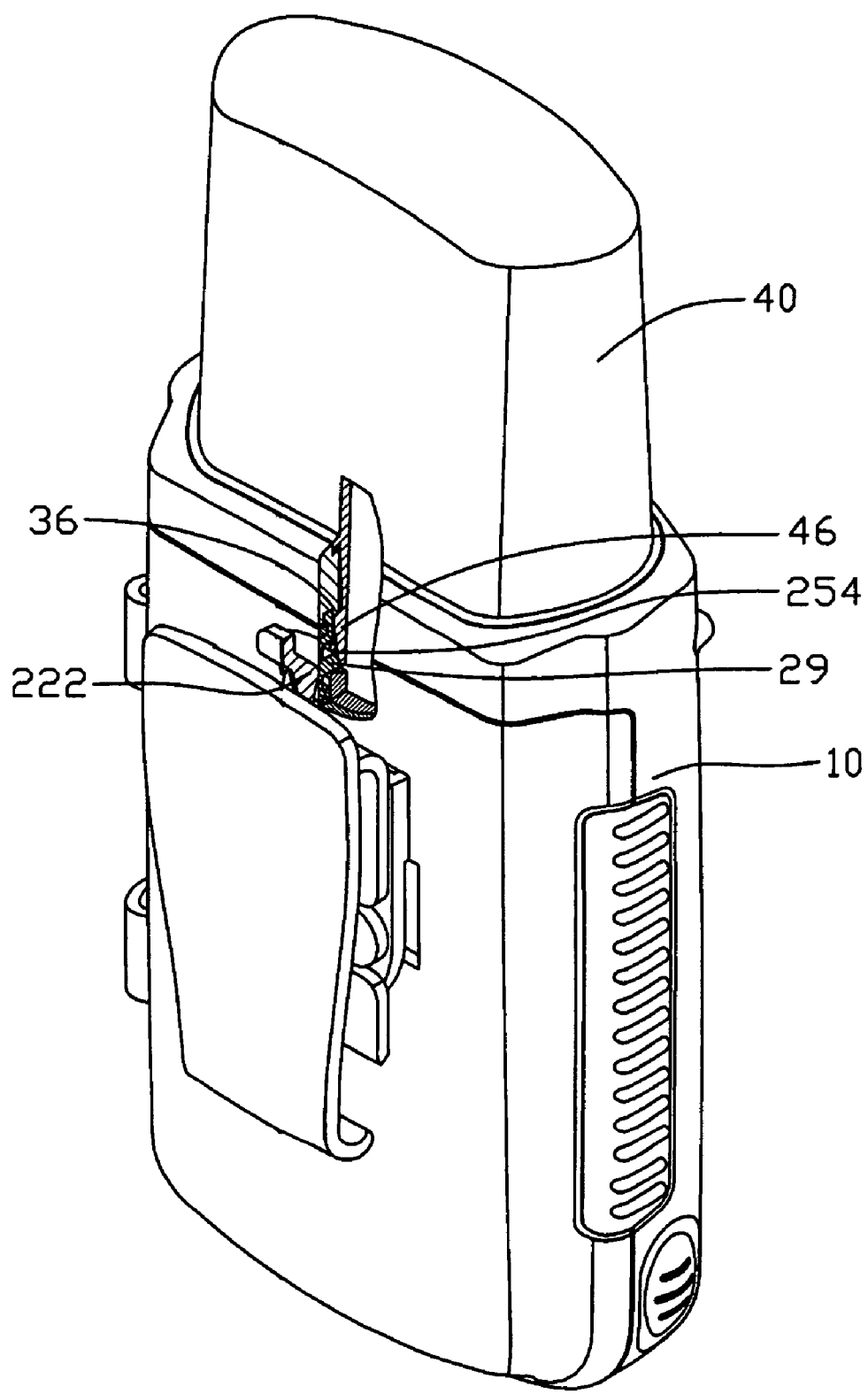
FIG. 3 is a cutaway view of the PDA carrying case of FIG. 1 that is in an using state.

Referring to FIGS. 1 and 2, a carrying case for a portable electronic device like a personal data assistant (PDA) includes a main body 10 and an expansion cover 40 attached to the main body 10 to provide extra receiving space for accessories of the PDA like an extension card plugged in the PDA. The main body 10 includes a base 30 and a back cover 20 mounted on the base 30.

The base 30 is hollow for holding a PDA. A rear wall of the base 30 is opened. A through opening 33 is defined in a top end of the base 30. Locking edges 36, 38 are thus formed on edges of the through opening 33 respectively. A pair of mounting sockets 302 is disposed on inside surfaces of side walls of the base 30.

A pair of positioning grooves 27 is defined in the back cover 20. A latching portion 28 is formed between the mounting grooves 27. A through hole 24 is defined in the back cover 20. The back cover 20 has a mounting clip 25 on inside surface. A through hole 254 is defined in a middle portion of the mounting clip 25 corresponding to the through hole 24 of the back cover 20. A pair of hooks 202 extends from the inside surfaces of side walls of the back cover 20 corresponding to the mounting sockets 302 of the base 30. When the back cover 20 is mounted, the mounting clip 25 is inserted into the base 30 and attaches to inside surface of the base 30, and the hooks 202 of the back cover 20 are inserted into the corresponding mounting sockets 302 of the base 30.

A locking member 21 is secured on an outside of the back cover 20 for hooking the PDA carrying case on a belt of an user. The locking member 21 includes a mounting portion 23 towards the back cover 20. A pair of sliding portions 232 bends from side edges of the mounting portion 23 corresponding to the mounting grooves 27 of the back cover 20. A resilient clip 22 extends upwardly from middle portion of the mounting portion 23. A positioning portion 224 protrudes from the resilient clip 22. A pressing portion 226 is formed at free end of the resilient clip 22. A projecting portion 222 protrudes from the resilient clip 22 between the positioning portion 224 and the pressing portion 226, corresponding to the through holes 24, 254.

A button 29 is received in the through hole 24, 254. When the pressing portion 226 of the resilient clip 22 is pushed, the projecting portion 222 urges the button 29 to move inwardly in the through 254 of the back cover 20.

A long first clasp 46 extends from a side of a bottom end of the expansion cover 40. A plurality of short second clasps 48 extends from an opposite side of the bottom end of the expansion cover 40. When the expansion cover 40 is mounted on the base 30, the first clasp 46 and the second clasp 48 engage with the locking edge 36 and the locking edge 38 respectively.

In assembly, the button 29 is inserted into the through holes 24, 254. The sliding portions 232 of the locking member 21 slide in the corresponding positioning grooves 27. When the positioning portion 224 of the locking member 21 hooks the latching portion 28 of the back cover 20, the locking member 21 is mounted on the back cover 20. The PDA is then inserted into the base 30. The back cover 20 is subsequently mounted on the base 30 to cover the PDA. The expansion cover 40 is inserted into the through opening 33 of the base 30. When the first clasp 46 and the second clasp 48 engage with the corresponding locking edge 36, 38 respectively, the expansion cover 40 is mounted on the base 30. At this time, a free end of the first clasp 46 abuts against one end of the button 29.

Figure 4:
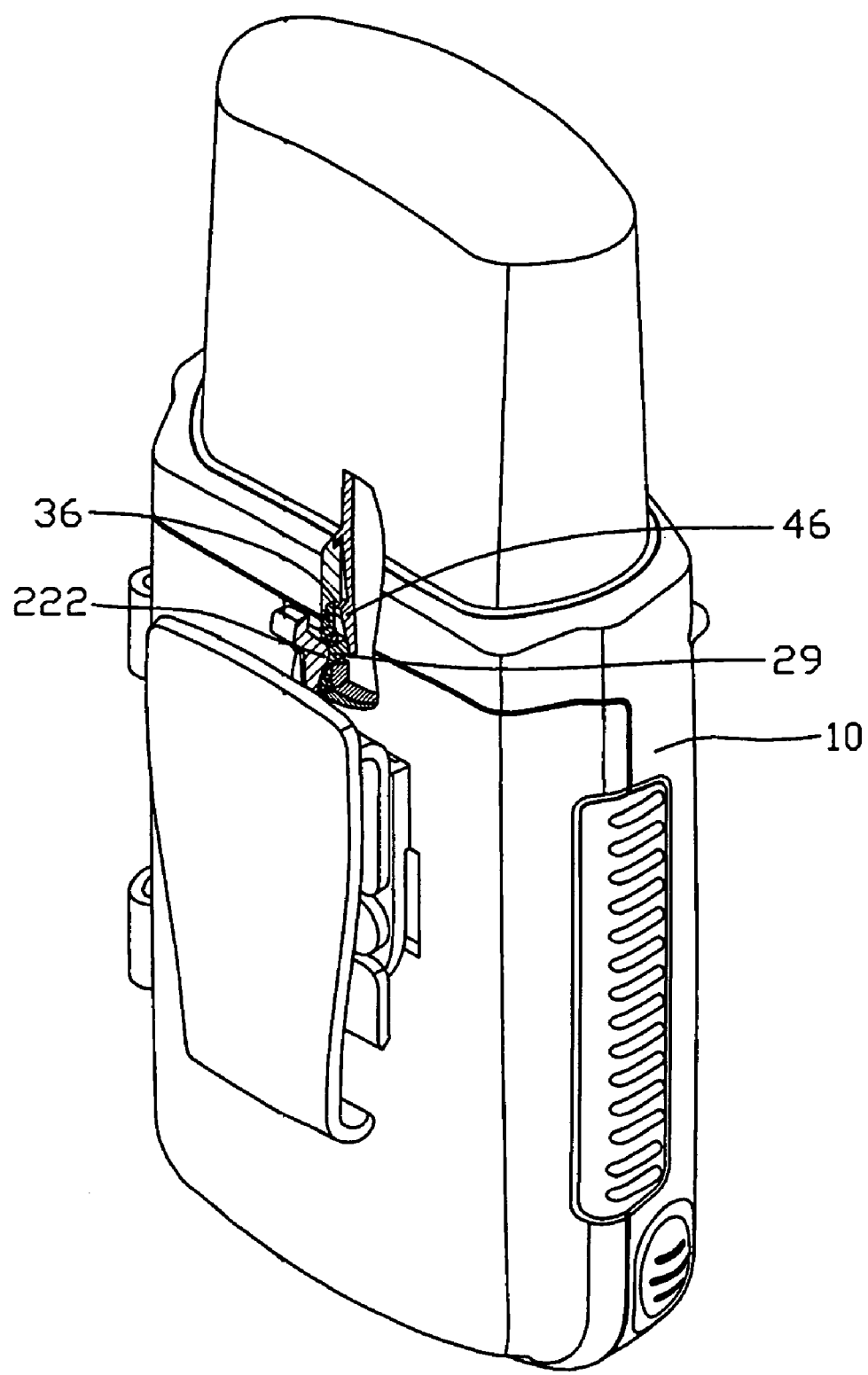
FIG. 4 is another cutaway view of the PDA carrying case of FIG. 1 that is in an using state.

Referring also to FIG. 4, in disassembly of the expansion cover 40, the locking member 21 is pushed. The pressing portion 226 of the resilient clip 22 is pressed to deform elastically. The projecting portion 222 of the resilient clip 22 thus extends into the through hole 24 of the back cover 20, and urges the button 29 to push the first clasp 46 inwardly. Thus the first clasp 46 disengages from the locking edge 36. The expansion card cover 40 is readily taken off from the main body 10.

According to a second embodiment of the invention, the button 29 can be omitted. The projecting portion 222 of the resilient clip 22 directly presses the first clasp 46 of the expansion cover 40.

According to a third embodiment of the invention, the resilient clip 22 can be omitted. A user can directly press the button 29.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

We claim:

1. A carrying case of a portable electronic device comprising:
   a main body defining a through hole;
   an expansion cover for enveloping expansion cards, a first clasp extending from the expansion cover for engaging with the main body; and
   a deformable resilient clip; wherein
   when the expansion cover is removed from the main body, the resilient clip deforms so as to have a portion of the resilient clip inserting through the through hole to urge the first clasp to disengage from the main body.

2. The carrying case as described in claim 1, wherein a second clasp extends from a side of the expansion cover opposite to the first clasp, and locking edges are formed at the main body corresponding to the first and second clasps.

3. The carrying ease as described in claim 1, further comprising a locking member mounted on the main body for the resilient clip extending therefrom.

4. The carrying case as described in claim 3, wherein a projecting portion protrudes from the resilient clip corresponding to the through hole.

5. The carrying case as described in claim 3, wherein the main body comprises a back cover for the locking member mounted thereon.

6. The carrying case as described in claim 5, wherein the back cover has a pair of sliding portions, and a pair of mounting grooves is defined in the back cover for receiving the mounting portions.

7. The carrying case as described in claim 6, wherein a latching portion is disposed on the back cover between the mounting grooves, a positioning portion protrudes from the resilient clip corresponding to the latching portion.

8. The carrying case as described in claim 1, wherein an opening is defined in the main body, and the expansion cover is plugged into the opening.

9. A carrying case of a portable electronic device comprising:
   a main body defining a through hole therein;
   an expansion cover, a first clasp extending from the expansion cover for engaging with the main body; and
   a button received in the through hole, the button being movable in the through hole to deform the first clasp; wherein
   when the expansion cover is removed from the main body, the button is pressed to move in the through hole so as to disengage the first clasp from the main body.

10. The carrying case as described in claim 9, wherein a second clasp extends from a side of the expansion cover opposite to the first clasp, and locking edges are formed at the main body corresponding to the first and second clasp.

11. The carrying case as described in claim 9, further comprising a deformable resilient clip for driving the button.

12. The carrying case as described in claim 11, wherein a projecting portion protrudes from the resilient clip corresponding to the through hole.

13. The carrying case as described in claim 11, wherein the main body comprises a back cover for the resilient clip mounted thereon.

14. The carrying case as described in claim 9, wherein an opening is defined in the main body, and the expansion cover is plugged into the opening.

* * * * *

UNITED STATES PATENT AND TRADEMARK OFFICE
CERTIFICATE OF CORRECTION

PATENT NO. : 7,630,745 B2
APPLICATION NO. : 11/145436
DATED : December 8, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Second Day of November, 2010

David J. Kappos
*Director of the United States Patent and Trademark Office*